United States Patent
Himmel et al.

(10) Patent No.: US 7,080,405 B2
(45) Date of Patent: Jul. 18, 2006

(54) LIMITING DEVICE FUNCTION

(75) Inventors: Maria Azua Himmel, Yorktown Heights, NY (US); Herman Rodriguez, Austin, TX (US); Newton James Smith, Jr., Austin, TX (US); Clifford Jay Spinac, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 929 days.

(21) Appl. No.: 10/046,998

(22) Filed: Jan. 16, 2002

(65) Prior Publication Data

US 2003/0133573 A1 Jul. 17, 2003

(51) Int. Cl.
*H04K 1/00* (2006.01)
*H04L 9/00* (2006.01)

(52) U.S. Cl. ............................. 726/4; 726/21; 380/270
(58) Field of Classification Search ................ 726/4, 726/21; 380/270
See application file for complete search history.

(56) References Cited

U.S. PATENT DOCUMENTS

| | | |
|---|---|---|
| 5,479,479 A | 12/1995 | Braitberg et al. |
| 5,964,879 A | 10/1999 | Dunstan |
| 6,052,579 A | 4/2000 | McC Estabrook |
| 6,092,209 A | 7/2000 | Holzhammer et al. |
| 2002/0142762 A1* | 10/2002 | Chmaytelli et al. ......... 455/418 |
| 2002/0152401 A1* | 10/2002 | Zhang et al. ............... 713/201 |
| 2003/0035397 A1* | 2/2003 | Haller et al. ............... 370/338 |
| 2003/0126462 A1* | 7/2003 | Howard et al. ............. 713/200 |
| 2003/0134627 A1* | 7/2003 | Himmel et al. ............. 455/419 |

FOREIGN PATENT DOCUMENTS

| | | |
|---|---|---|
| JP | 9083676 | 3/1997 |
| JP | P2000-49686 A | 2/2000 |

* cited by examiner

*Primary Examiner*—Matthew Smithers
(74) *Attorney, Agent, or Firm*—Mark S. Walker; Streets & Steels; Jeffrey L. Streets

(57) ABSTRACT

A system, method and computer program product that send wireless control messages to electronic devices, such as audio and video recorders, cameras, radios, televisions, mobile phones, portable or handheld computers and personal digital assistants, that have come within an environment or that are in an environment that changes. In such an environment, a wireless receiver in the mobile electronic device receives the control messages. In a hardware implementation, electronic gates are set to disable the one or more features of the device. In a software implementation, current power status flags are set in a memory device within the mobile electronic device to a reduced power setting. Outside the environment, the electronic gates or power status flags revert to full power. The device driver for each feature of the mobile electronic device will reject I/O operations inconsistent with the current power status flags for that feature.

28 Claims, 8 Drawing Sheets

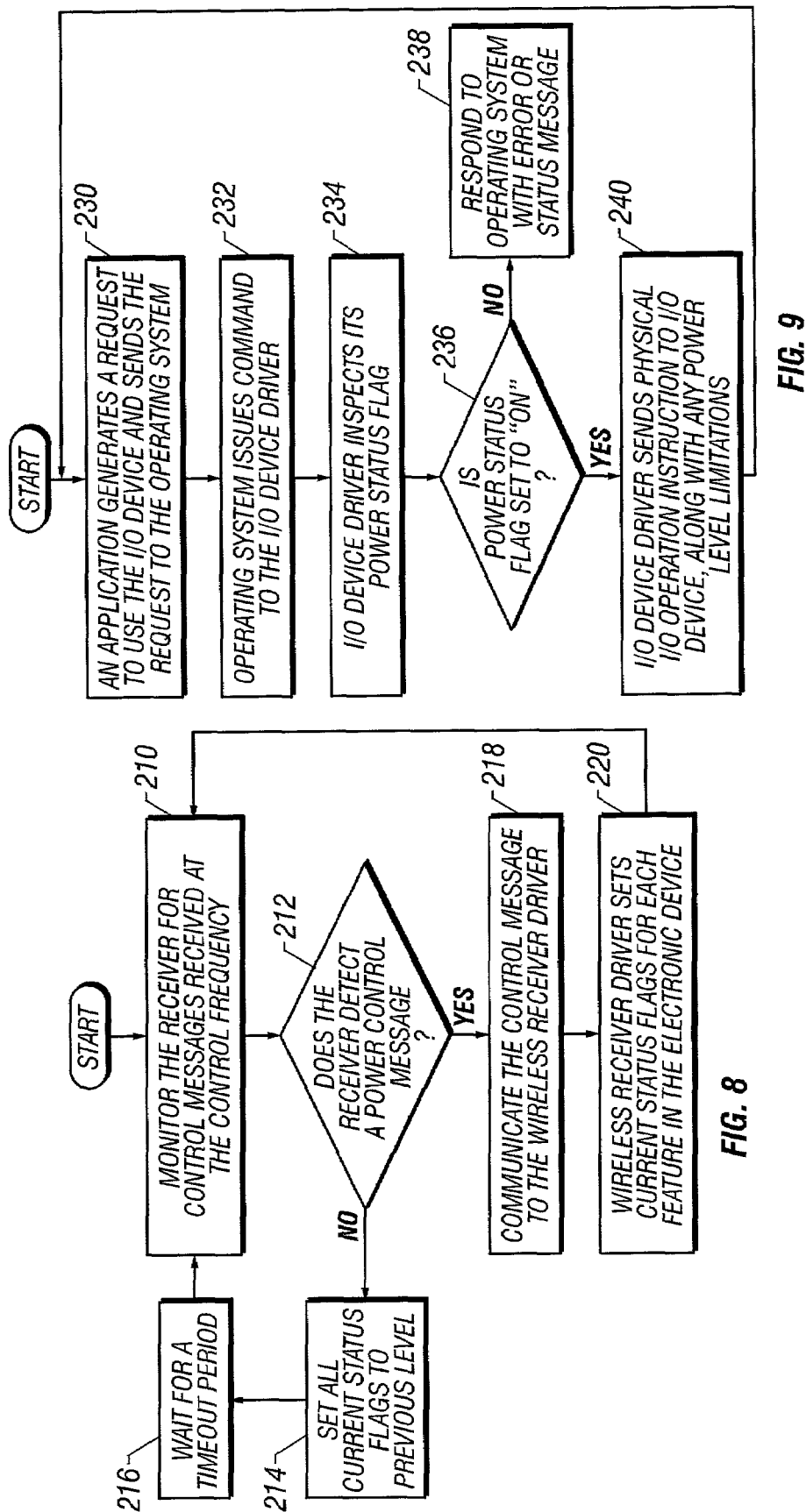

LIMITING DEVICE FUNCTION

BACKGROUND OF THE INVENTION

1. Field of the Invention

The present invention relates to methods and apparatus for limiting the use of electronic devices in a certain environment or location.

2. Description of the Related Art

The improvements to mobile electronics devices, such as portable CD players, mobile telephones and handheld computers, has led to their widespread use without regard for the location of use. The ability of these mobile electronics devices to be taken and used almost anywhere is very convenient, but there are times and places where use of these devices is inappropriate or dangerous. Warning signs and announcements are typically used to instruct users to turn off these devices in restricted areas, but compliance with these instructions is primarily left to the user.

Examples of areas where use of mobile electronics devices is inappropriate include concert halls, movie theatres, and libraries. Examples of areas where use of mobile electronics devices is dangerous include aircraft, hospitals, and automobiles. While self policing of usage restrictions has been the primary means for limiting use of these devices, there have also been a few attempts to impose electronic restrictions on the devices themselves.

Presently, there are a few systems suitable for the very limited purpose of limiting radio wave communications. Even though some of the methods accomplish this result through the use of interference signals of different or even stronger radio waves, none of these attempts addresses the larger problem of limiting the use of a variety of mobile electronics devices without creating secondary problems and none address restricting these devices as changes occur in the environment in which the device is operating.

Therefore, there is a need for a system, method and computer program product that allow a control system to impose usage restrictions upon mobile electronics devices that come within a broadcast range of the control system. There is also a need to impose usage restrictions at the individual feature or component level, so that other features on the same mobile electronic device that do not violate the usage restrictions can continue to be used. It would be desirable if the system automatically imposed the restrictions without relying upon user intervention or programming. It would also be desirable if the system allowed the full use of individual features to be restored automatically upon removing the mobile electronics device from the restricted environment.

SUMMARY OF THE INVENTION

The present invention provides a method for external control over operation of an electronic device having a wireless receiver. The preferred method includes broadcasting a wireless control message within a broadcast range established by a controlling system, wherein the control message includes an instruction to limit operation of one or more components within the electronic device. The instruction is received in the wireless receiver when the device is located within the broadcast range. The wireless receiver then communicates the instruction to set one or more electronic gates, wherein setting the one or more electronic gates determines whether the one or more components can be operated. Preferably, the method further includes resetting the one or more electronic gates to a default condition if the wireless receiver has not received the instruction to limit operation within a preset time period. The electronic device may be mobile or stationary and is preferably selected from a telecommunication device such as a phone, camera, audio recorder, video recorder, pager and a computer.

In an alternative embodiment, the method comprises broadcasting a wireless control message within a broadcast range or environment established by a controlling system, wherein the control message includes an instruction to limit operation of one or more components or functions within the mobile electronic device. When the mobile electronic device is located within the designated broadcast range, the wireless receiver of the mobile electronic device receives the limiting instruction. The limiting instruction is then communicated from the wireless receiver to one or more device drivers in the mobile electronic device that operate the one or more components. Device drivers in the mobile electronic device are configured to receive commands from the operating system to specifically control a device. Commands or programming instructions that are delivered from an application program or operating system to the one or more device drivers may then be refused by the device drivers if the commands violate the limiting instructions. Application programs communicate with operating systems or device drivers, rather than communicating directly with the device.

The method may further comprise restoring full operation of the one or more components if the wireless receiver does not receive the instruction to limit operation within a preset time period. One of the components may be a power supply or other individual components or features of the wireless device. Further, the instruction may set a power level for one or more components.

The method may provide an instruction that limits operation of two or more of the components. Optionally, the instruction provides messages to two or more device drivers, wherein the messages are selected from "enable a driver", "disable a driver", or combinations thereof. It is preferred to automatically enable each of the device drivers when the device drivers have not received a wireless control message in a preset period of time. Examples of mobile electronic devices include a mobile telephone, camera, audio recorder, video recorder, and a computer.

The present invention also provides a computer program product including instructions embodied on a computer readable medium. The instructions comprise: receiving instructions for receiving a wireless control message including operating limits for one or more components within the mobile electronic device; communicating instructions for communicating the operating limits from the wireless receiver to one or more device drivers that operate the one or more components; and refusing commands delivered to the one or more device drivers that violate the operating limits. Optionally, the computer program product will further comprise restoring instructions for restoring full operation of the one or more components if the wireless receiver does not receive the operating limits within a preset time period.

The foregoing and other objects, features and advantages of the invention will be apparent from the following more particular description of a preferred embodiment of the invention, as illustrated in the accompanying drawing wherein like reference numbers represent like parts of the invention.

BRIEF DESCRIPTION OF THE DRAWINGS

FIG. 8 is a flowchart for a first embodiment of a control management process for use by a handheld computer.

FIG. 9 is a flowchart for a first embodiment of a method for using an input/output device that is in communication with the handheld computer.

DETAILED DESCRIPTION

Figure 1:
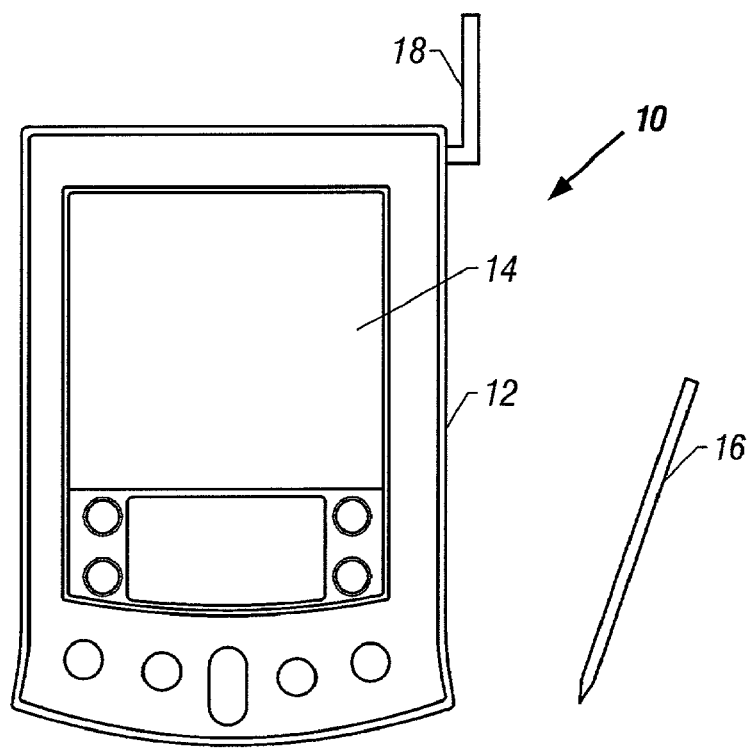
FIG. 1 is an example of a prior art computer suitable for use in accordance with the present invention.

The present invention provides a system that sends wireless control messages to mobile electronic devices within a given range or environment. As the mobile electronic device is brought within the range or environment, a wireless receiver in the mobile electronic device receives the control messages and restricts the use of one or more features accordingly. For example, the control message may turn off power to the display of a mobile telephone or reduce the power level to a compact disc player.

In a software embodiment, the control message received by the electronic device is used to set status flags in a memory device within the mobile electronic device in accordance with the desired control, such as reduce a power setting. As the mobile electronic device is taken out of the range or environment, the status flags revert to a normal or previous setting. The device driver for each feature of the mobile electronic device will thus reject I/O operations that are inconsistent with the current status flags for that feature.

In a hardware embodiment, the system may receive the control message and set one or more electronically controlled latches so that the subject I/O device may not be addressed. By relying upon hardware, it is not necessary to change the device drivers to accept wireless control messages as is necessary with the software embodiment. It is preferable in either the software or hardware embodiments to have the control messages transmitted at a standard frequency that is dedicated to control messages and to design the system to prevent the user from over-riding the control messages.

The wireless control messages are transmitted from a transmitter located in the environment, region, location or facility where it is intended to limit operation of any or all of the mobile electronic devices. Examples of locations where this ability to limit operation is useful includes, without limitation, aircraft, concert halls, libraries, and hospitals. The wireless control messages may include instructions for setting the power level of the entire mobile electronic device or setting the power levels of one or more individual features of the mobile electronic device. Examples of individual features for which it may be desirable to limit power, or otherwise control, include, without limitation, speakers, microphones, transmitters, and displays. Furthermore, these features may be included in various mobile electronic devices including, without limitation, audio and video recorders, cameras, radios, televisions, mobile phones, portable or handheld computers, and personal digital assistants. It is preferred that the transmitter broadcast the wireless control messages throughout the entire environment so that any and all of the mobile electronic devices entering the environment receive and implement the control messages. As dictated by the dimensions or contents of the environment, a plurality of transmitters may be used to broadcast the same or different control messages.

While it is possible to implement the control message as an analog signal, it is preferred to transmit the message as a digital signal. Accordingly, the mobile electronic device includes a receiver which may be implemented on a stand-alone receiver or a transmitter/receiver ("transceiver") that does not make use of the transmitter capability for the embodiments described herein.

In a software embodiment, the digital protocol for the digital message may include any existing or future wireless communications protocol, such as BLUETOOTH (a trademark of Bluetooth SIG, Inc.) which provides a short range transmission. The BLUETOOTH Protocol Architecture was developed by the Bluetooth Special Interest Group to provide specifications for different protocol stacks having a common BLUETOOTH data link and physical layer. BLUETOOTH is suitable for implementing close proximity wireless communications between devices. Interoperable application programs can be written onto the BLUETOOTH protocol stack to provide customized usage models. While BLUETOOTH is the preferred protocol, other existing and future wireless protocols may also be implemented within the scope of the invention.

The present invention may be implemented to control electronic devices having a wireless receiver and a microprocessor controller capable of executing an operating system. When the electronic device is within proximity of a wireless control signal transmitter, one or more features or devices of the electronic device can be controlled. The electronic device receives the wireless control signals so long as the electronic device is within the range of the wireless transmissions. While much of the following discussion describes the invention as implemented to control a handheld computer, it should be recognized that the invention lends itself equally to control of other electronic devices having a wireless receiver and a processor that controls the operation of the electronic device, specifically mobile telephones. It should be recognized that the present invention may be incorporated into many other types of electronic devices as well, specifically including, without limitation, portable or handheld computers, personal digital assistants, cameras, and audio and video recorders.

As used herein, "handheld personal computer" (H/PC) means a small general computing device having a processing unit that is capable of running one or more application programs, a display, and an input mechanism that is typically something other than a full-size keyboard. The input mechanism might be a keypad, a touch-sensitive screen, a track ball, a touch-sensitive pad, a miniaturized QWERTY keyboard, or the like. The term "wireless", as used herein, shall be taken to include any communication means without wires, such as radio frequency transmissions and infrared transmissions.

FIG. 1 is an illustration of a handheld personal computer, specifically a personal digital assistant (PDA) 10, such as the IBM WorkPad® from International Business Machines Corporation. However, the invention is compatible with other brands and types of handheld personal computers, such as a personal organizer, a palmtop computer, a computerized notepad, or the like.

Handheld computing device 10 has a casing 12 and an LCD (liquid crystal display) 14 with a touch-sensitive screen mounted in the casing 12. A stylus 16 may be used with the device to enter data through the touchscreen display 14. The handheld computing device 10 can also be implemented with a wireless transceiver (internal) such as an IR (infrared) transceiver and/or an RF (radio frequency) transceiver coupled to antenna 18.

Figure 2:
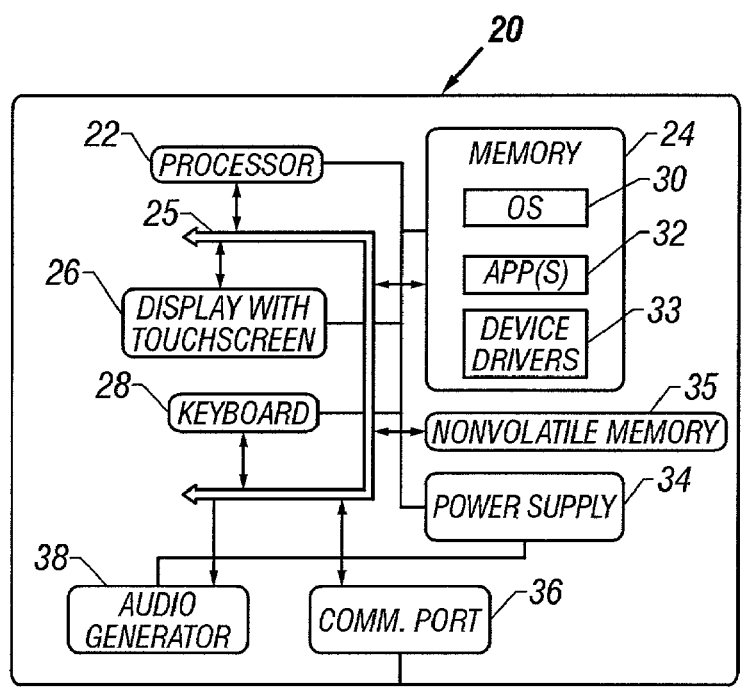
FIG. 2 is a schematic diagram of a prior art computer system suitable for use in accordance with the present invention.

FIG. 2 is a block diagram showing the functional components of the handheld computing device 20. It has a processor 22, a memory 24, a display 26, an optional keyboard 28, and a communications port 36 in communication with an internal system bus 25. The memory generally includes both volatile memory 24 (e.g., RAM) and non-volatile memory 35 (e.g., ROM, PCMCIA cards, hard-disk drives). An operating system 30 is resident in the memory 24 and executes on the processor 22. The H/PC 20 preferably runs the Palm® OS operating system from Palm Computing Incorporated. However, the handheld computing device may be implemented with other operating systems, such as Windows® CE or Linux.

One or more application programs 32 are loaded into memory 24 and run on the operating system 30. Examples of applications include email programs, scheduling programs, PIM (personal information management) programs, word processing programs, spreadsheet programs, Internet browser programs, and so forth. Device drivers 33 are also provided in memory for controlling operation of the display 26, keyboard 28, audio generator 38 and other I/O devices not shown.

The H/PC 20 has a power supply 34, which is implemented as one or more batteries or fuel cells. The power supply 34 might further include an external power source that overrides or recharges the built-in batteries, such as an AC adapter or a powered docking cradle.

Figure 3:
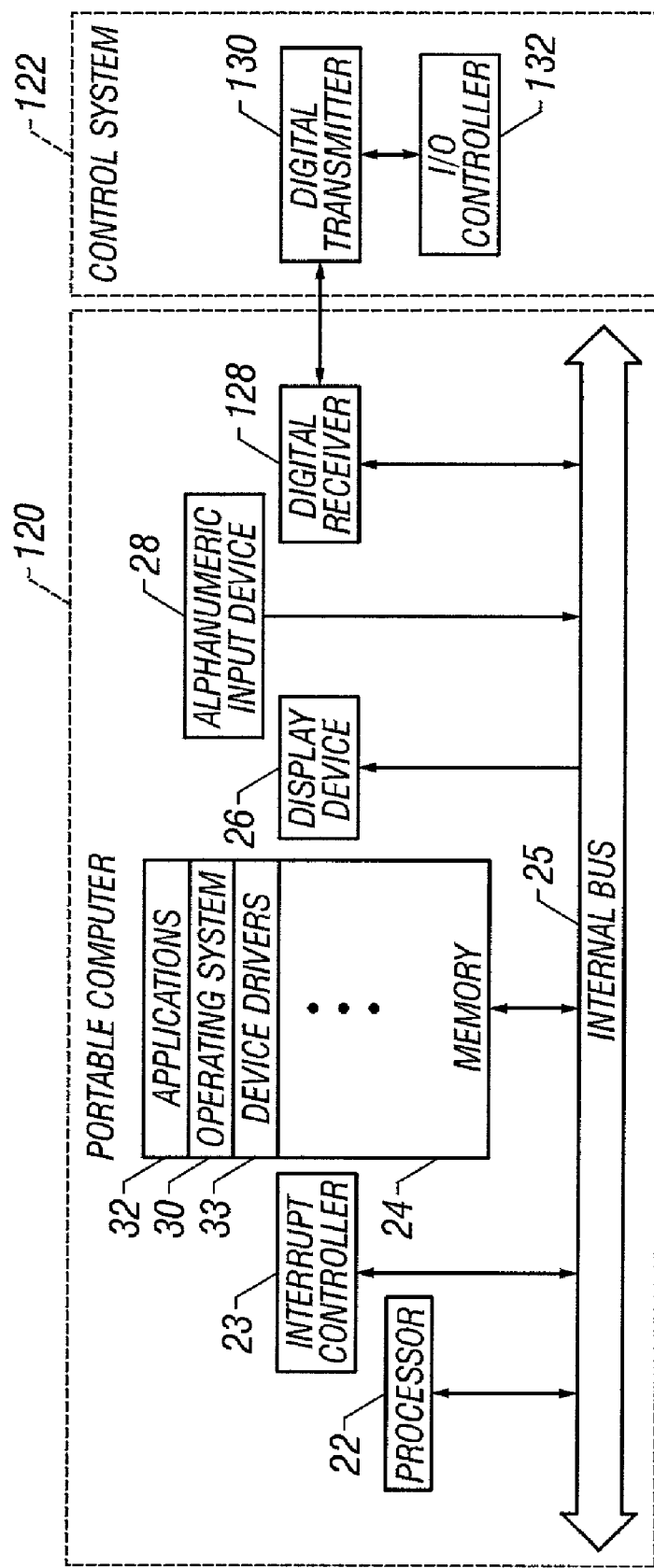
FIG. 3 is a schematic diagram of a first embodiment of a wireless electronic device in communication with a control system.

FIG. 3 is a schematic diagram of a first embodiment of a computer 120 having a wireless digital receiver 128 for receiving control messages from a transmitter 130 of a control system 122. Similar to the handheld computer of FIG. 2, the computing device 120 has a processor 22, an interrupt controller 23, an internal or external memory 24, a display device 26, and an alphanumeric input device 28, such as an optional keyboard. An operating system 30, one or more applications 32, and one or more device drivers 33 are resident in the memory 24 and executed on the processor 22. The components of the computer 120 communicate over the internal bus 25.

The control system 122 includes a digital transmitter or transceiver 130 and an input/output controller 132, such as a computer, that operates the transmitter. The input/output controller 132 is responsible for managing the control messages that are broadcast by the digital transmitter.

Figure 4:
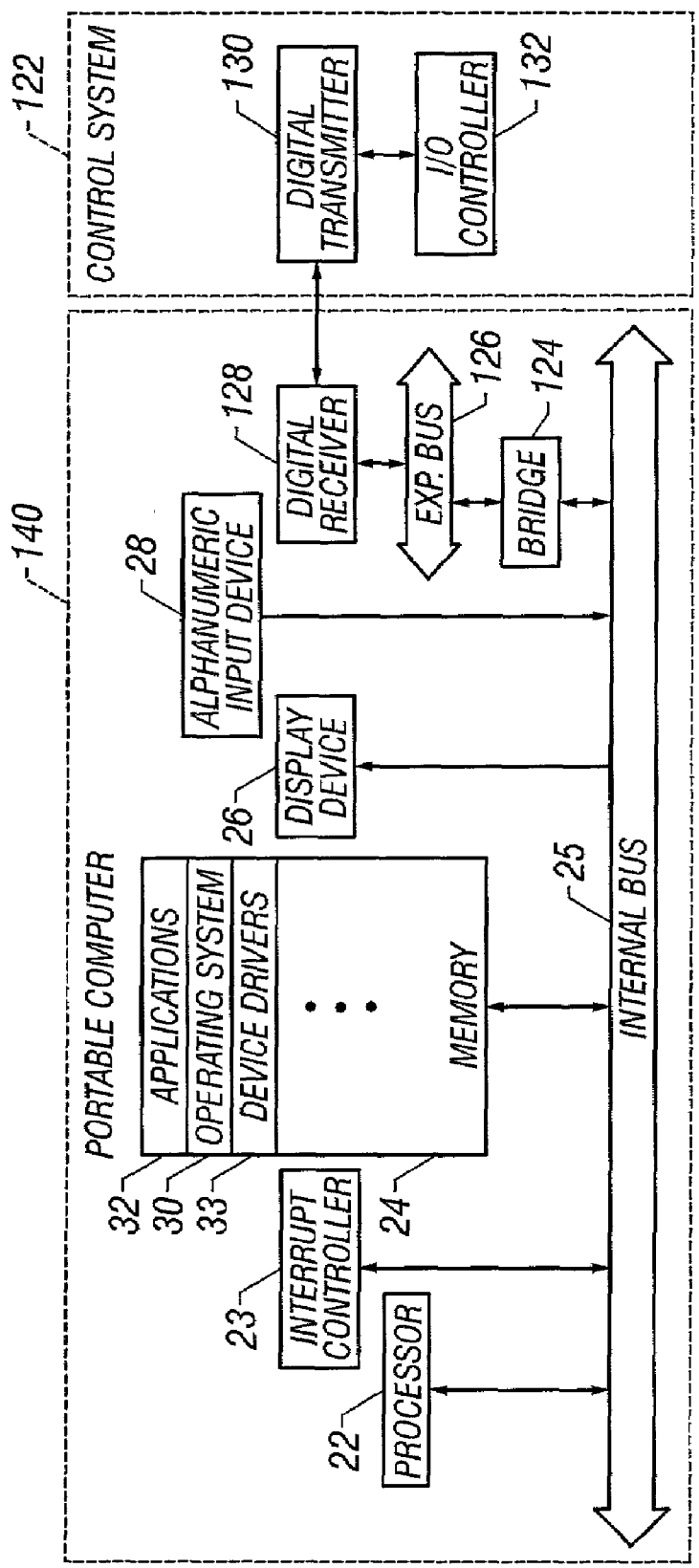
FIG. 4 is a schematic diagram of a second embodiment of a wireless electronic device in communication with a control system.

FIG. 4 is a schematic diagram of a second embodiment of a computer 140 in wireless communication with the control system 122. The computer 140 is substantially similar to the computer 120 of FIG. 3, except that the digital receiver 128 is in communication with an expansion bus 126, such as a USB or PCI bus, that is in turn in communication with the internal bus 25 through a bridge 124 rather than communicating directly with the internal bus 25. By communicating with the expansion bus 126, the digital receiver 128 may take the form of an adapter card.

Figure 5:
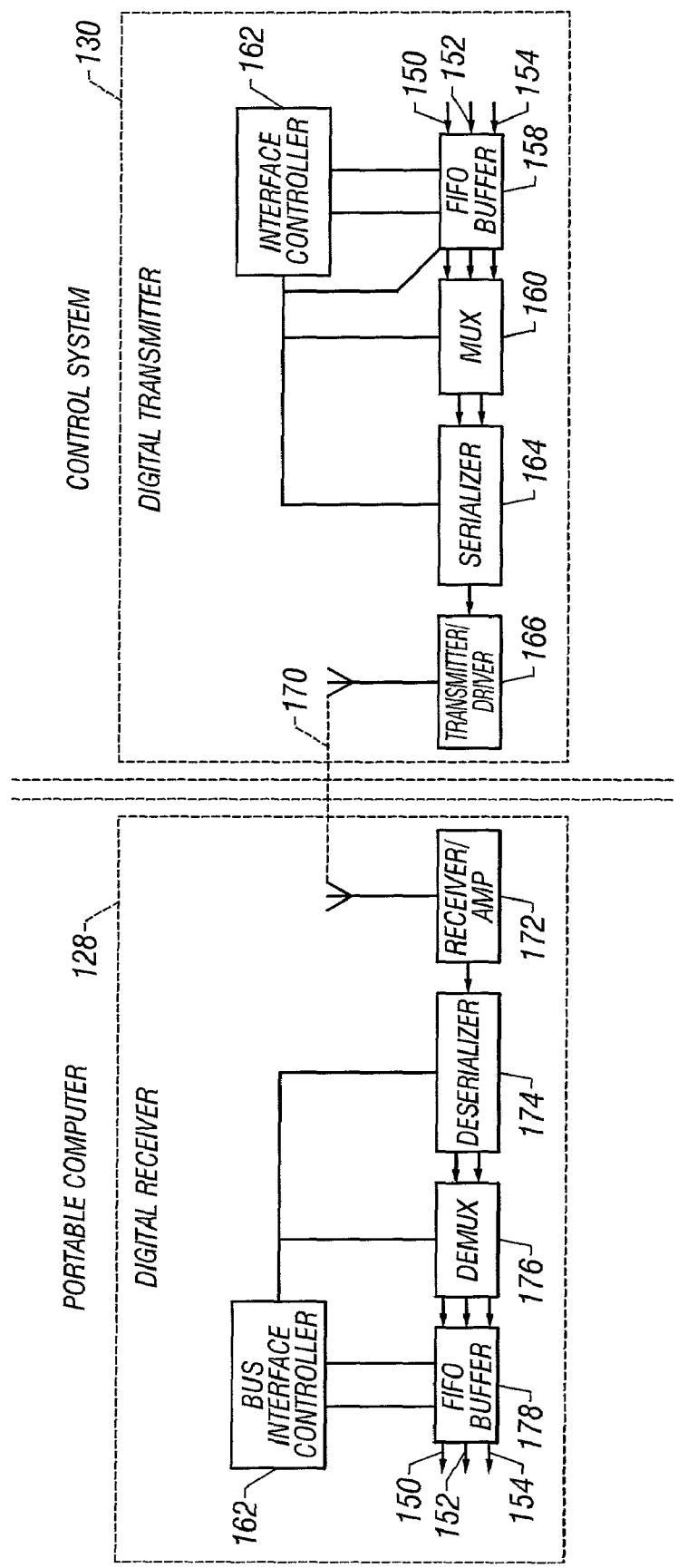
FIG. 5 is a schematic diagram of the digital transceiver in a handheld computer receiving a control message from a control transmitter.

FIG. 5 is a schematic diagram of the digital receiver 128 in the computer and the digital transmitter 130 in the control system. It can be seen from the figure that the input/output 150, address locations 152 and data 154 are carried from the I/O controller of the control system to the FIFO buffer 158, which sends the data on to the multiplexer 160 under the control of the bus interface controller 162. The bus interface controller then directs information to the serializer 164. The serializer 164 then sends information to the transmitter/driver 166 which then goes out as a wireless transmission 170, such as radio frequency waves or infrared light.

Incoming wireless transmissions 170 enter a receiver/amplifier 172 and are deserialized in the deserializer 174. Under the control of the bus interface controller 162, the deserializer 174 sends the deserialized data to the demultiplexer 176. The data then goes from the demultiplexer 176 to the FIFO buffer 178, to be made available to the portable computer's bus. It should be noted that while the system of FIG. 5 could be implemented as software, rather than hardware, the performance might be slower. Furthermore, both the control system transmitter 130 and the portable computer receiver 128 could also be provided in the form of transceivers. The operation and use of the digital transceivers is described in U.S. Pat. No. 5,877,882, which patent is hereby incorporated by reference herein. The architecture shown in FIG. 5 permits clock variation between the computer and the wireless peripheral device. Communication with devices made by different manufacturers is easily achievable since any device that conforms to the wireless link requirements can communicate with the computer.

Figure 6:
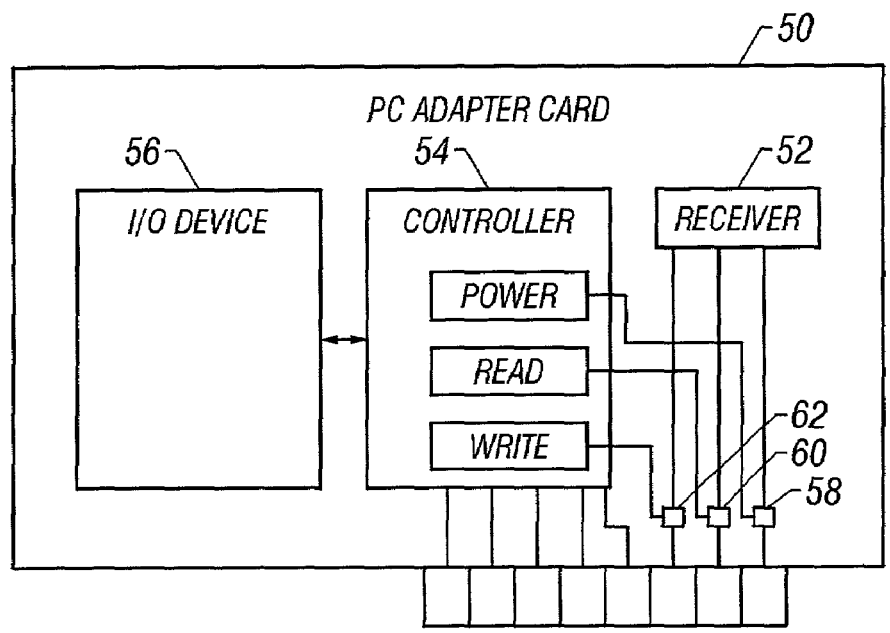
FIG. 6 is a schematic diagram of a PC adapter card that embodies the hardware embodiment of the present invention.

FIG. 6 is a schematic diagram of a PC adapter card that illustrates the hardware embodiment of the present invention. The PC adapter card 50 includes a receiver 52, a controller 54, and an input/output device 56 that is, for purposes of illustration, capable of both read and write operations. Examples of such I/O devices would include, without limitation, memory and external CD ROM drives. The receiver 52 is in communication with a number of gates or latches, shown here including a power latch 58, a read latch 60, and a write latch 62. The receiver receives the control message and sets the latches in accordance with the control message. An example of a simple, single-frequency control message would essentially provide a series of three data bits representing the intended status of each latch. For example, a control message comprising "on", "on", and "off" would indicate to have the power "on" and the read feature "on", but the write feature "off". When the power or feature is "on", the latch would be placed in such a position or condition so that the controller is in electronic communication with the corresponding adapter card pin that will be in communication with the bus.

Figure 7:
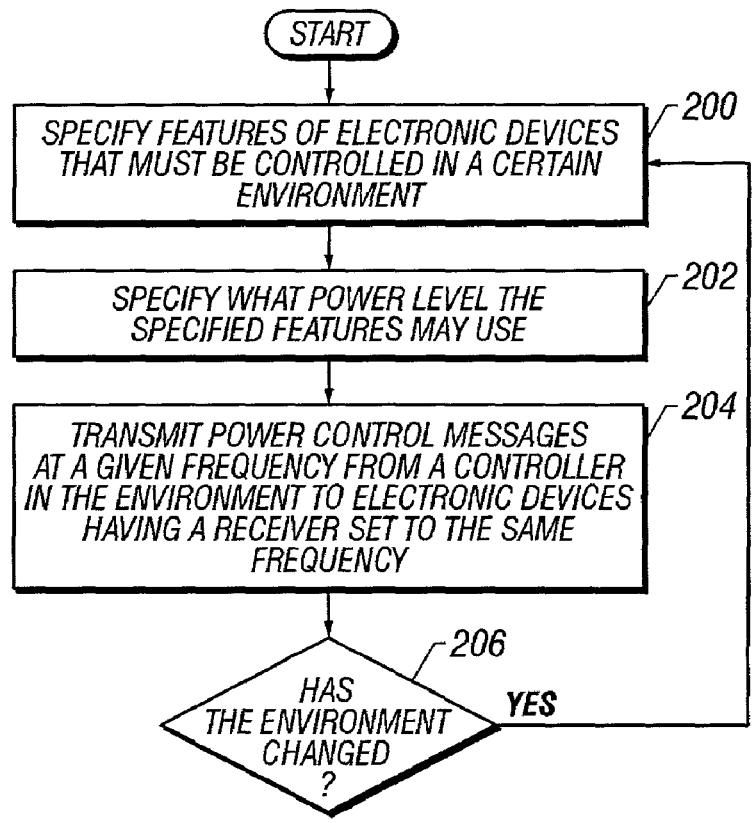
FIG. 7 is a flowchart for a method used by a control system to transmit control messages.

FIG. 7 is a flowchart for a method executed by a control system that includes a transmitter for broadcasting control messages. In state 200, the control system specifies the features of mobile electronic devices that must be controlled in a certain environment. The features specified may be the result of a user manual input to the system or a program established by a user to specify features to control on the basis of conditions or status of the environment. In state 202, the control system specifies the power level that the specified features may use. As with the specified features themselves, the power level specified for each feature may be the result of a user manual input to the system or a program established by a user to specify the power level on the basis of conditions or status of the environment.

After specifying the features and power levels to be controlled, state 204 provides for the control system to transmit control messages at a given frequency to mobile electronic devices having a receiver set to the same frequency. In state 206, it is determined whether the environment has changed in a manner that would change the control message. For example, the environment in an aircraft is different during takeoff than it is during flight. If the environment has not changed in this manner, then control returns to state 204 to again transmit the same control messages. If the environment has in fact changed, then control is passed to state 200 so that the control system can again specify the features and the power levels that should be controlled.

FIG. 8 is a flowchart for a software embodiment of a control management process for use by a mobile electronics device, such as a handheld computer. In state 210, a receiver in the handheld computer is monitored for control messages at the control frequency. It is then determined, in state 212, whether the receiver has detected a control message. If no control message is detected in state 212, the state 214 provides for all current status flags to be set to their previous level and state 216 provides a wait state for a timeout period. However, if a control message is received, then, in state 218, the control message is communicated to the wireless receiver driver. Then, in state 220, the wireless receiver driver sets current status flags for each feature in the mobile electronics device, perhaps within individual I/O device drivers. It should also be recognized that since the control message is broadcast to a variety of types of mobile electronics devices, it is preferred for the control message to include a full set of instructions for all features that should be controlled in any device. Accordingly, mobile electronic devices without one or more features will simple ignore that portion of the message and implement only the remaining portions of the message that are application to the device. The process is repeated continuously while the mobile electronic device is turned on.

FIG. 9 is a flowchart for a method of using an input/output device that is in communication with the computer. In state 230, an application that is being executed in the processor of the computer generates a request to use the I/O device and sends the request to the operating system. In state 232, the operating system issues a command to the I/O device driver. Then, in state 234, the I/O device driver inspects its associated power status flag that was set in accordance with the process in FIG. 8. A determination is made in state 236, whether the power status flag is set to "on". If the power status flag is not "on", then no further action is taken toward implementing the command made upon the I/O device driver and a message is returned to the operating system 238. However, if the power status flag is "on", then, in state 240, the I/O device driver sends a physical I/O operation instruction to the I/O device, along with any power level limitations. This process is repeated each time an application generates an I/O request, since the power status flags may change at any time in accordance with the process in FIG. 8.

Figure 10:
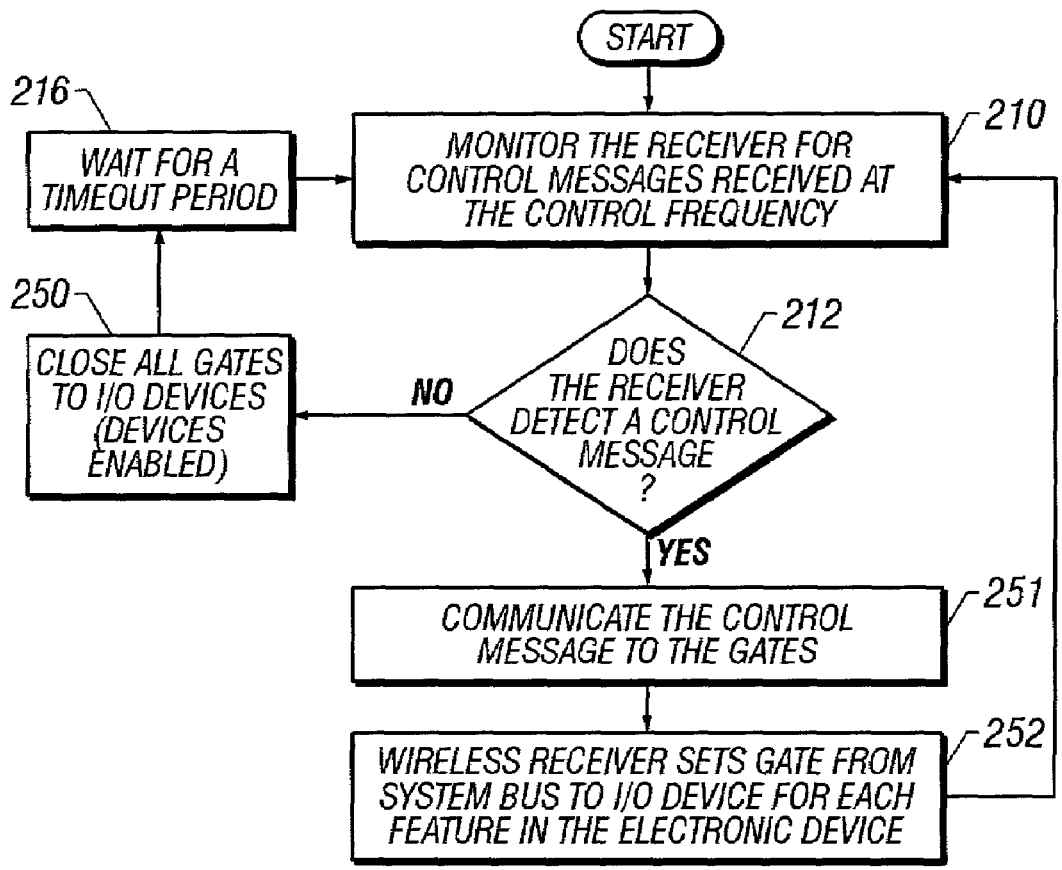
FIG. 10 is a flowchart for a second embodiment of a control management process for use by a handheld computer.

FIG. 10 is a flowchart for a second embodiment of a power management process for use by a handheld computer. The flowchart is substantially similar to the flowchart of FIG. 8 and like numerals have been used to reference like steps. However, unlike FIG. 8, the process involves the use of gates between the system bus and the individual I/O devices or features of the mobile electronic device. Accordingly, if the receiver does not detect a control message in state 212, then, in state 250, the gates to the I/O device are closed so that communication is allowed and the device is enabled. Furthermore, after communicating the instructions to the gates in state 251, the receiver sets the gates leading from the system bus to the I/O device for each feature in the electronic device in state 252.

Figure 11:
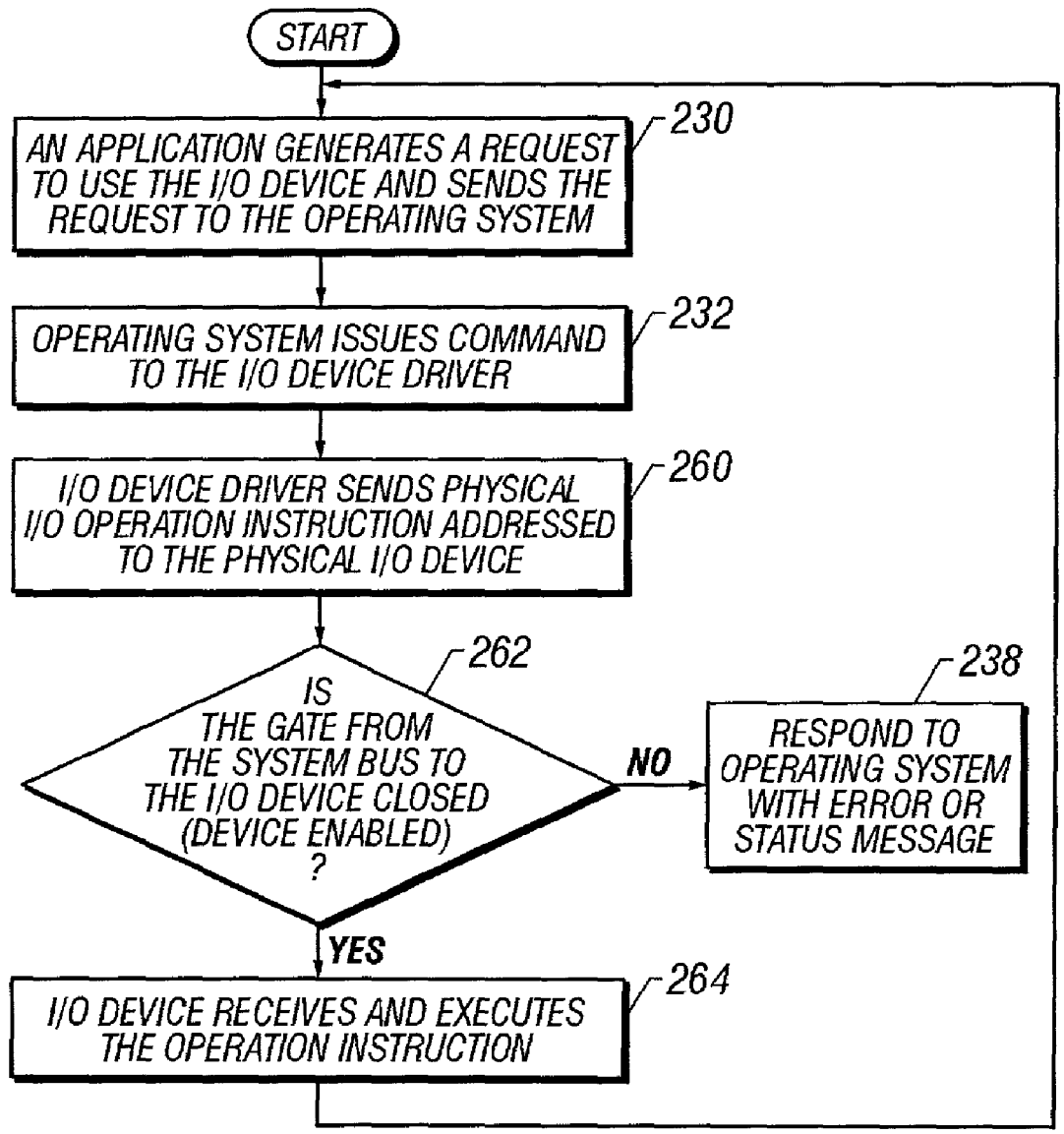
FIG. 11 is a flowchart for a second embodiment of a method for using an input/output device that is in communication with the handheld computer.

FIG. 11 is a flowchart for a second embodiment of a method for using an input/output device that is in communication with the handheld computer. The flowchart is substantially similar to the flowchart of FIG. 9 and like numerals have been used to reference like steps. However, unlike FIG. 9, the process involves the use of gates between the system bus and the individual I/O devices or features of the mobile electronic device. Accordingly, after the operating system issues a command to the I/O device driver in state 232, the I/O device, in state 260, sends a physical I/O operation instruction addressed to the physical I/O device. In state 262, it is determined whether the gate is closed (I/O device enabled) from the system bus to the I/O device to which the I/O operation instruction is directed. If the gate is not closed (I/O device disabled), then no further action is taken in state 238. If the gate is closed, then, in state 264, the I/O device or feature receives and executes the operation instruction. This process is repeated each time an application generates an I/O request, since the status of the gates may change at any time in accordance with the process in FIG. 10.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A method for external control over operation of an electronic device having a wireless receiver, comprising:
broadcasting a wireless control message within a broadcast range established by a controlling system, wherein the control message includes an instruction to limit operation of one or more components within the electronic device;
receiving the instruction in the wireless receiver while the device is located within the broadcast range; and
responsive to the instruction, setting one or more electronic gates implemented as hardware in the device that control operation of the one or more components.

2. The method of claim 1, further comprising:
resetting the one or more electronic gates to a default condition if the wireless receiver does not receive the instruction to limit operation within a preset time period.

3. The method of claim 1, wherein the instruction limits operation of two or more of the components within the electronic device.

4. The method of claim 3, further comprising:
automatically resetting the one or more electronic gates to a default condition if the wireless receiver has not received a wireless control message in a preset period of time.

5. The method of claim 1, wherein the electronic device is selected from a telephone, camera, audio recorder, video recorder, and a computer.

6. A method for external control over operation of an electronic device having a wireless receiver, comprising:
broadcasting a wireless control message within a broadcast range established by a controlling system without identifying the electronic device, wherein the control message includes an instruction to limit operation of one or more components within the electronic device;
receiving the instruction in the wireless receiver when the device is located within the broadcast range;
communicating the instruction from the wireless receiver to one or more device drivers that operate the one or more components; and
refusing commands delivered to the one or more device drivers that violate the instruction.

7. The method of claim 6, further comprising:
restoring full operation of the one or more components if the wireless receiver does not receive a further instruction to limit operation within a preset time period.

8. The method of claim 6, wherein one of the components is a power supply.

9. The method of claim 6, wherein the instruction sets a power level for one or more components.

10. The method of claim 6, wherein the command originates from an application program to request use of one of the components.

11. The method of claim 6, wherein the instruction limits operation of two or more of the components.

12. The method of claim 6, wherein the instruction provides messages to two or more device drivers, and wherein the messages are selected from enable a driver, disable a driver, or combinations thereof.

13. The method of claim 12, further comprising:
automatically enabling each of the device drivers when the wireless receiver has device drivers that have not received a wireless control message in a preset period of time.

14. The method of claim 6, wherein the electronic device is selected from a phone, camera, audio recorder, video recorder, and a computer.

15. A computer program product that includes instructions embodied on a computer readable medium for external control over operation of an electronic device having a wireless receiver, the instructions comprising:
broadcasting instructions for broadcasting a wireless control message within a broadcast range established by a controlling system, wherein the control message includes a limiting instruction to limit operation of one or more components within the electronic device;
receiving instructions for receiving the limiting instruction in the wireless receiver while the device is located within the broadcast range; and
setting instructions, responsive to the limiting instructions, for setting one or more electronic gates implemented as hardware in the electronic device that control operation of the one or more device components.

16. The computer program product of claim 15, further comprising:
resetting instructions for resetting the one or more electronic gates to a default condition if the wireless receiver has not receive the instruction to limit operation within a preset time period.

17. The computer program product of claim 15, wherein the instruction limits operation of two or more of the components within the electronic device.

18. The computer program product of claim 17, further comprising:
resetting instructions for automatically resetting the one or more electronic gates to a default condition if the wireless receiver has not received a wireless control message in a preset period of time.

19. The computer program product of claim 15, wherein the electronic device is selected from a telephone, camera, audio recorder, video recorder, and a computer.

20. A computer program product that includes instructions embodied on a computer readable medium for external control over operation of an electronic device having a wireless receiver, the instructions comprising:
receiving instructions for receiving a wireless control message not specifically addressed to the electronic device, wherein the message includes operating limits for one or more components within the electronic device;
communicating instructions for communicating the operating limits from the wireless receiver to one or more device drivers that operate the one or more components; and
refusing commands delivered to the one or more device drivers that violate the operating limits.

21. The computer program product of claim 20, further comprising:
restoring instructions for restoring full operation of the one or more components if the wireless receiver does not receive the operating limits within a preset time period.

22. The computer program product of claim 20, wherein one of the components is a power supply.

23. The computer program product of claim 20, wherein the operating limits set a power level for one or more components.

24. The computer program product of claim 20, wherein the command originates from an application program to request use of one of the components.

25. The computer program product of claim 20, wherein the control message includes operating limits for one or more of the components.

26. The computer program product of claim 20, wherein the operating limits includes operating limits for one or more of the components, and wherein the operating limits are selected from enable a driver, disable a driver, or combinations thereof.

27. The computer program product of claim 26, further comprising:
enabling instructions for automatically enabling each of the device drivers when the wireless receiver has not received a wireless control message in a preset period of time.

28. The computer program product of claim 20, wherein the electronic device is selected from a phone, camera, audio recorder, video recorder, and a computer.

* * * * *